United States Patent
Tabla et al.

(10) Patent No.: US 7,423,081 B2
(45) Date of Patent: Sep. 9, 2008

(54) THERMOPLASTIC FORMULATIONS FOR MANUFACTURING PIPES AND ACCESSORIES FOR HOME AND INDUSTRIAL USE, AND PROCESS FOR THE SAME

(75) Inventors: Octavio Parra Tabla, Queretaro (MX); Luis Vazquez Estrada, Queretaro (MX); Alfonso Perez Sanchez, Queretaro (MX)

(73) Assignee: Servicios Condumex S.A. de C.V., Queretaro QRO (MX)

( * ) Notice: Subject to any disclaimer, the term of this patent is extended or adjusted under 35 U.S.C. 154(b) by 410 days.

(21) Appl. No.: 11/074,361

(22) Filed: Mar. 7, 2005

(65) Prior Publication Data
US 2006/0111495 A1 May 25, 2006

(51) Int. Cl.
*C08L 91/06* (2006.01)
(52) U.S. Cl. .............. 524/180; 524/318; 524/350; 524/479; 524/487
(58) Field of Classification Search ............... 524/180, 524/318, 334, 487, 350, 479
See application file for complete search history.

(56) References Cited

U.S. PATENT DOCUMENTS

| | | | | |
|---|---|---|---|---|
| 5,194,471 A | * | 3/1993 | Hartitz | 524/180 |
| 5,969,045 A | * | 10/1999 | Schmitz et al. | 525/104 |
| 2003/0157321 A1 | * | 8/2003 | Dalal et al. | 428/369 |

FOREIGN PATENT DOCUMENTS

JP 01217008 * 8/1989

* cited by examiner

*Primary Examiner*—Peter Szekely
(74) *Attorney, Agent, or Firm*—Carmen Pili Ekstrom

(57) ABSTRACT

Thermoplastic formulations to manufacture pipe and fluid accessories for home and industrial use comprising a polyvinyl chlorinated thermoplastic compound (CPVC) at a level up to 100 phr, oxidizing agents, polymer promoter agents, and impact modifier agents characterized because it includes a blend of internal and external lubricant agents based on: paraffinic wax selected from paraffinic wax from calcium stearate, polyethylene wax, oxidized polyethylene wax, stearic acid and fatty acid waxes, polyethylene wax, homopolymer of oxidized ethylene, paraffinic wax and mercaptide thermostabilizing agents.

23 Claims, No Drawings

THERMOPLASTIC FORMULATIONS FOR MANUFACTURING PIPES AND ACCESSORIES FOR HOME AND INDUSTRIAL USE, AND PROCESS FOR THE SAME

CROSS REFERENCE

The present application claims the benefit of the priority date of a prior foreign application under 35 U.S.C. § 119, namely Mexican Patent Application No. PA/a/2004/011608, filed on Nov. 23, 2004. The foreign application is incorporated herein by reference in its entirety.

BACKGROUND OF THE INVENTION

1. Field of the Invention

The present invention relates to the manufacturing of pipes and interconnection accessories based on new thermoplastic CPVC formulations obtained through the photochlorination process of water-suspended PVC, presenting good processability and high productivity and meeting cell classification 23447-B as a compound as outlined in ASTM-D1784 standard and NMX-E-181-SCFI-2003 standard as a finished product.

2. Description of the Previous Art

Background: CPVC is a resin obtained from PVC chlorination such as described in U.S. Pat. Nos. 2,996,489, 3,100, 762, 3,334,077, 3,334,078, 3,506,637, 3,534,013, 3,591,571, 4,049,517, 4,350,798, 4,377,459, 4,412,898 and 4,459,387. Its main objective is to obtain a new resin with properties that are different from PVC properties, and above all a higher thermal resistance. This means that the service condition interval widens compared to PVC and this fact has opened new fields of application for said resin.

With regard to CPVC, because it is more rigid than PVC, with higher heat distortion temperature, it is an ideal material to operate with hot or cold water in ducts and storage tanks. The high content of chlorine of the CPVC molecule compared to PVC besides conferring some favorable characteristics, also confers other characteristics that are not as desirable, i.e., the rigidity of the molecule impedes its movement and thus it is a material which is more difficult to process, and at the same time it becomes fragile and, as PVC, tends to breakdown under the high temperature conditions required for its processing. For this reason, CPVC has to be mixed with several chemical agents in order to have the desired behavior, both in the processing stage as well as during its performance as a product. Among the components added to it, thermal stabilizers are known that prevent and/or delay degradation, impact modifiers to make it less fragile and process auxiliaries as well as lubricants among other additives to obtain a good property balance.

The behavior of the product during processing and in the field depends on the concentrations of the additive types selected for a formula and, as is well known in the art, many additives have positive effects on some characteristics of the material, but at the same time show negative effects with regard to other characteristics and finally the formulator has to find the right balance to obtain a product with the desired characteristics.

Among the impact modifiers, acrylonitrile-butadiene-styrene (ABS) terpolymers and rubbers such as CPE can be used as mentioned in U.S. Pat. No. 5,591,497, but preferably their use is not recommended. The use of polyorganosiloxanes known in the art and commented in U.S. Pat. No. 5,981,663 as impact modifiers for CPVC is not recommended either. Such materials can be used from 5 to 15 parts per hundred (phr) of resin in the formula and the quantity to use depends highly on the chlorine content of the CPVC.

An important aspect to be taken into account with the polymer materials and, especially with such a rigid and viscous compound as a CPVC compound can become, is its processability. To improve said processability, several solutions are recommended in the state of the art. One of said solutions is to add materials such as plasticizers, but although they help, they have a negative effect on other properties; other mixtures of CPVC have been published, such as in U.S. Pat. No. 3,268,626, with some styrene and acrylonitrile copolymers with relatively low viscosities, together with a second butadiene and acrylonitrile polymer. In U.S. Pat. No. 3,678,132, the improvement of the CPVC processability is presented through the introduction of a Polyvinyl Chloride (PVC) mixture with an alpha methyl styrene, methyl metacrylate and acrylonitrile terpolymer and a butadiene based polymer grafted with styrene, methyl metacrylate and acrylonitrile, in proportions ensuring a better processability. Moreover, in U.S. Pat. No. 4,304,884 CPVC mixture with copolymers prepared with alpha methyl styrene, vinyl compounds selected among vinyl benzenes, acrylates and aliphatic nitriles is mentioned. All these attempts, among others, include in general the use of lower molecular weight resins, acrylic based processing aid specifically designed to improve the behavior of the material during the plastification and to improve the resin fluidity.

In order to improve the CPVC processability, a whole range of lubricants known in the art is used. However, and for the specific case of the lubricants, the general rule is to keep their concentration at the minimum level, because in high quantities problems can occur such as processing problems, thermal stability problems and the properties of the final product can deteriorate.

The whole range of possible lubricants is known in the art and although in many patents lubrication level of 5 phr are mentioned, such as in the U.S. Pat. No. 5,981,663 and in published Patent Number 2003/0157321 A1, the fact is that in none of the examples mentioned in these references, the lubrication levels are above 3 phr and this is because the general idea is to keep the lubrication level as low as possible.

It is thus an object of the present invention to supply a CPVC compound with high output capacities both for extrusion as well as for injection purposes, fulfilling classification 23447-B as a compound as outlined in ASTM-D1784 and fulfilling NMX-E-181-SCFI-2003 as a finished product.

DESCRIPTION OF THE INVENTION

In the literature there are numerous references on how to modify CPVC to help eliminate its deficiencies and to be in a position to take advantage of its good characteristics, but a problem is how to obtain a compound that is easy to process and yet retain the capacity to meet the requirements imposed on it. In the case of this invention, ASTM-D 1784 sets the specifications for a CPVC compound. The cells corresponding to given physical properties of a material are identified as described hereinafter:

For a classification 23447-B, the first digit (2) identifies the resin corresponding in this case to CPVC, the second digit (3) is to establish the impact strength requirement, the third digit (4) is to establish the tensile strength, the fourth digit (4) is to establish the elasticity modulus, the fifth digit (7) is to establish the Heat Distortion Temperature and the letter (B) is an indication of the chemical resistance. Thus, and according to ASTM-D1784, the classification 23447-B means:

| PROPERTY | UNIT | CODE | ASSIGNED VALUE |
|---|---|---|---|
| Base resin | — | 2 | CPVC |
| Impact strength (Izod) | J/m | 3 | 80.1 |
| Tensile strength | MPa | 4 | 48.3 |
| Tensile elasticity modulus | MPa | 4 | 2482 |
| Heat distortion temperature | ° C. | 7 | 100 |
| Weigh increase 93 d $H_2SO_4$ 14 days 55° C. | % | B | 5 |

In order to obtain a compound that retains the given classification it is also requested that the material be processable in extrusion and injection industrial equipment typically used for the manufacturing of pipes and installation accessories, because several of the additives used to improve the processability are antagonistic to the described characteristics and this means that a good formulation should be easy to extrude and mold, i.e., that the compound does not degrade during extrusion or injection and that its viscosity is low enough so that the material shows characteristics that are adequate to give good production capacity.

According to the invention, several material formulations are prepared for the manufacturing of CPVC pipe and accessories, trying to fulfill cell classification 23447-B as outlined by ASTM-D1784 as a compound and NMX-E-181-SCFI-2003 classification as a product, in such a way that the main component is a CPVC resin available on the market, with chlorine contents up to 69% and preferably ranging between 66 and 68%.

The most adequate CPVC resins are commercially available, with polymerization grade (it is defined as the number of times the basic unit is repeated in the polymer) ranging from 700 to 1100 and are obtained through the suspension photo-chlorination process, from PVC with K values ranging from 57 to 68. Examples of said resins are available from Sekisui and Kaneka under the trade names CPVC HA 53K, HA25L, H829 and H727. The K value is a measure of the polymerization grade and is determined from the viscosity values of the PVC homopolymer as virgin resin, dissolved in cyclohexanone at 30° C., according to standardized methods.

The CPVC resin can eventually be mixed in several proportions with PVC resin or other CPVC resin with different chlorine contents and/or different K values, ranging from 1 to 50%. The combination of one or several of the mentioned resins is made to modify the CPVC resin, but according to the present invention, said mixtures are not preferred.

Because the CPVC resin is fragile, impact modifier polymers are mixed to it. The problem is that the impact modifiers tend to have a negative influence on other properties such as melt index, Heat Distortion Temperature, tensile modulus, weather resistance and thermal stability, and thus its levels of use shall have to be according to the fulfillment of the reference standards and the processability of the compound.

Preferably, in the instant invention, between 6 and 9 parts of modifier per hundred parts of resin are used to meet the required classification.

The impact modifiers compensate the fragility inherent to the CPVC and the action mechanism of said modifiers includes the addition of an elastomer compound or rubber compound the object of which is to absorb or dissipate the energy caused by an impact. The most adequate impact modifiers for the formulations object of this invention are the modifiers that include polybutadiene with high concentration of butadiene, such as polymethylmetacrylate-butadiene-styrene (MBS) terpolymers, with the structure of a reticulated elastomer core known in the art as "core shell", such as the ones available in Kaneka and Rohm and Haas of the series B-#, wherein the # symbol represents different numbers corresponding to different grades and Paraloid BTA, respectively.

The lubricants, as in the case of PVC, are added to CPVC to lower the internal and external friction effects onto the polymer and to prevent the adherence of said polymer onto the metal parts of the process equipment. In order to prevent the adherence, what is involved is the separation between plastic and metal, and it is thus clear that materials with polymer limited compatibility are most useful for such purposes. Waxes and paraffinic oils, ester amide and fatty acid waxes, as well as metal salts, are the most useful materials for this purpose.

One way of describing how lubricants act is through what is known as external lubrication and internal lubrication. The external lubrication consists in promoting the CPVC sliding on the metal and the non-adherence of said CPVC onto the metal surfaces. This is obtained through the selection of agents that are little compatible with the plastic matrix and with some affinity for the metal, so that the lubricant forms an intermediate barrier between CPVC and metal.

The internal lubrication consists in the reduction of the melt viscosity and thus the reduction of the heating of the material through internal friction, said lubricant agents generally show a better compatibility towards CPVC, compared to the external lubricants.

In the present invention, the many effects obtained with different types and combinations of lubricants are studied as well as their effects on the rheology of the material and it is concluded that lubrication levels ranging from 3.5 to 7 phr and preferably from 4 to 5.5 phr are adequate to obtain compounds with improved processability, without affecting the properties in such a way that they do not meet cell classification 23447-B as a compound as outlined in ASTM-D1784 and NMX-E-181-SCFI-2003 as finished product. Examples of lubricants are metal stearates, montanic acid waxes, high and low molecular weight paraffinic waxes, and their mixtures, as well as oxidized waxes and polyglycerols and the combinations between the different types mentioned and other lubricants. Specific examples of external lubricants are Advalube E-2100 available from Rohm and Haas, Licolub XL 445 available from Clariant, among others. Said lubricants are used alone or combined at levels ranging from 3.5 to 7 phr, preferably from 4 to 5.5 phr.

Besides the above described components, other components have to be present such as thermal stabilizers and others can be present or not such as antioxidant agents, colorants, pigments, mineral fillers and processing aids, said components fulfilling different functions already known in the art of the CPVC formulation. Said ingredients can be used in quantities that can help and do not affect the properties, in such a way that the cell classification required is not affected.

The stabilizers that have shown to be most effective and adequate for the described application are the stabilizers containing high tin levels and that are derived from alkyltin compounds. Said compounds include methyltin, octyltin, mixtures of them, dialkyltin dicarboxylates, methyltin mercaptides, butyltin mercaptides, tin esters and preferably, but without limitation, metal tin mercaptides because of their high efficiency, such as Advastab TM-161 available from Rohm and Haas and with levels of use ranging from 1 to 4 phr, most preferably from 1 to 2 phr.

In order to avoid some degradation reactions in which oxygen participates, antioxidants can be used such as Irganox 1010 (tetrakis[methylen(3,5-di-tert-butyl-4-hydroxyhydrociannamate)methane or stearically hindered phenols such as the ones sold by Crompton under the name Naugard AO 71076. Said materials can be used in a range from 0.2 to 3 phr, but preferably from 0.5 to 1.0 phr, giving good results.

The most adequate pigments and colorants can be carbon black, organic or inorganic pigments of various colors and titanium dioxide, among others. Said ingredients can be added within a range from 0.001 to about 8 phr, but preferably less than 2.7 phr.

Within the mineral fillers that can be used for this purpose, we can mention, among others, calcium carbonate, micas, talc, and silica, that can be added in a range from 2 to 10 phr, but it has been found that said materials increase the viscosity of the compound and in some cases make it more rigid, and thus preferably their use is not recommended.

The processing aids (melt promoters) are polymeric materials added to the CPVC in small quantities, from 1 to 5 phr, and although there are several types of polymers fulfilling said function, the most effective ones are acrylates and metacrylates. Among the process auxiliaries available on the market, we can mention Paraloid of the K-100 and K-400 series, supplied by Rohm and Hass. For the purposes of this invention, mixtures of different processing aids can be used, that can be present in the mixtures in a range from 1 to 5 phr and preferably from 1 to 3 phr.

The mixtures shown in this document are manufactured in conventional equipment used for PVC and CPVC, which are known as intensive mixers or turbomixers, wherein through the control of time and/or temperature, the ingredients are added sequentially, until a homogeneous dry mixture is obtained. Said homogeneous dry mixture can remain in powder, mainly in the case of the extrusion process or can be plasticized to be then injected or extruded. To demonstrate the advantages of the present invention, several illustrative examples are presented hereinafter. However, the invention is not limited in any way to the described details and formulations.

EXAMPLES

In order to demonstrate the relevant aspects of the instant invention, some formulations are presented, as well as the results of their properties obtained, starting from a typical formulation for the mentioned application.

TABLE 1

F-01

| COMPONENT | PROPORTION phr |
| --- | --- |
| CPVC (K = 58 to 67 as PVC) | 100 |
| Antioxidant | 0.75 |
| Acrylic processing aid | 1.5 |
| Methyltin mercaptide stabilizer | 3.0 |
| Impact modifier (MBS) | 5.0 |
| Lubricant compound (one pack) paraffinic wax, Calcium stearate and oxidized polyethylene wax | 2.0 |

TABLE 2

| Fusion time (min.) | 0.5 |
| --- | --- |
| Stable torque (N-m) | 35 |
| Stable torque temperature (° C.) | 219 |
| Dynamic thermal stability (DTS) time (min.) | 4 |
| Melt index (g/10 min.) | 1.02 |

The processability and stability measurements started through the determination of the dynamic thermal stability (DTS). Said test consists in measuring the time and the torque at a selected test temperature, using a device known as plastograph. The parameters that are determined and used in this case for comparison purposes are: time (DTS), said time is defined as the time requested, after the material plastification, to increase the torque value, after a stabilization time. Said increase is attributed to the beginning of the material degradation, accompanying the polymer rigidization through polyene formation and molecular crosslinking. Another parameter is the plastification time which is shown as a peak in the torque-time curve, which occurs after the maximum load or peak. This occurs when, after loading the material and increasing the torque, the compound starts compacting within the chamber and upon reaching the time when it begins to plasticize, the torque increases up to a maximum, to diminish afterwards. In the case of various materials, the load peak and the plastification peak can occur simultaneously. The next parameters, the stable torque and stable torque temperature, are measured when the material has already passed the plastification stage and before the degradation, i.e., the torque-time curve zone where the torque remains relatively stable during a period of time. All these parameters do no depend solely on the polymer; they also depend on the temperature, the chamber load factor, the stabilizers, lubricants and equipment operation conditions, among other elements, and are normally used as a comparative test between various compounds in order to determine the relative processability. In this case, the mentioned parameters were measured at 200° C., 30 rpm's, and a load factor of 70% was used.

The other characteristic measured to determine the processability of the materials was the Melt Index, which basically consists in confining the material within a cylinder under controlled temperature, said cylinder having a standardized size hole. After the material reaches the test temperature, a stem of known weight is placed in the material, to have the material flow through the above mentioned hole. What is done is to take the quantity of material exiting from the equipment hole after 10 minutes of test and weighing it to determine the weight in grams that exited the cylinder during the 10 minutes test.

Based on the formula given in Table 1 (F-01), the design of experiment technique (DOE) was used, varying to low and high levels the amount of the following components: Impact Modifier, Stabilizer, Processing Aid and lubricant systems. The F-01 formula presented as starting point, fulfills the cell classification 23447-B as compound as outlined in ASTM-D1784, but has a "relatively low" processability.

The lubricant, melt promoter (processing aid) and the stabilizer, improve the thermal stability time but, specifically in the case of the lubricant system, it was determined that it strongly affects the Heat Distortion Temperature (HDT) and the Elasticity Modulus.

To compensate the "negative" effect of the lubricant and based on the results found using the DOE technique, a second base formula was determined, from which the lubricant types and levels were modified, in order to improve the processability of the compound, without affecting the classification according to ASTM-D1784.

The series of formulations shown as example in Table 3 are to demonstrate the work mechanism, but the present invention is not limited exclusively to said formulas. The components used in each one of the examples shown are also described in Table 3 and the properties according to the requirements of classification of cell 23447-B outlined by ASTM-D1784, as a compound, are in Table 4, while the processability properties are shown in Table 5.

For all the formulations shown, a CPVC resin was used with a K value as PVC resin ranging from 58 to 67, an antioxidant, an acrylic melt promoter (processing aid), methyltin mercaptide-type stabilizers, MBS-type impact modifier, materials known in the art but not for their properties when mixed in unexpected critical preparations. Lubricants modified with regard to type and proportions in order to, obtain the desired effect are also shown.

TABLE 3

| COMPONENT | F-02 | F-03 | F-04 | F-05 |
|---|---|---|---|---|
| CPVC | 100 | 100 | 100 | 100 |
| Antioxidant | 0.75 | 0.75 | 0.75 | 0.75 |
| Melt promoter | 1.5 | 1.5 | 1.5 | 1.0 |
| Thermal stabilizer | 3 | 3 | 3 | 2 |
| Impact modifier | 10 | 10 | 10 | 8 |
| Paraffinic wax 1 | 0.5 | | | |
| Calcium stearate | 0.25 | | | |
| Polyethylene wax 1 | | | | 0.25 |
| Oxidized polyethylene wax | | | | 0.3 |
| Stearic acid plus fatty acid waxes 1 | | | | 0.25 |
| Polyethylene wax 2 | | | 0.75 | 1.1 |
| Oxidized ethylene homopolymer | | | 0.5 | 0.73 |
| Paraffinic wax 2 | | | 1.5 | 2.2 |

All the components are shown in parts per hundred of resin (phr). Polyethylene wax 2 is a homopolymer of polyethylene with a melting point between 92° C. and 122° C. Paraffin wax 2 is a mixture if carbohydrate paraffin waxes with melting point between 88° C. and 14° C.

Manufacturing Process:

The CPVC resins and the additives shown in Tables 1 and 3 were prepared in an intensive mixer under a well established addition order, consisting of the following steps: first, the resin is introduced and the temperature is increased up to 60° C.; as a second step, the stabilizer is added and the mixture temperature is increased up to 90° C. At this temperature and as a third step, the rest of the additives are added, except the lubricants that are added when the mixture reaches 105° C. Then, the mixture is cooled. The dry blend obtained from the above process is plasticized in a roller mill at a temperature of 200° C., till a homogeneous viscous mass is obtained and extracted from the mill in a slab. The layers were cut and placed between 2 plates to be pressed at 200° C. under the following conditions: 5 minutes without pressure and then 5 minutes with a 30 ton pressure. The plates obtained in the above described procedure are left to rest during 24 hours under laboratory standard conditions (23+/−2° C. and 50% relative humidity), and are then evaluated according to classification cell 23447-B as outlined by ASTM-D1784 and the processability of the dry blend was assessed as compound in the plastograph. The values of the evaluated properties are shown in Table 4 and 5 and for comparison purposes the values of a commercially available compound are included.

TABLE 4

| PROPERTY | F-02 | F-03 | F-04 |
|---|---|---|---|
| Tensile strength (MPa) | 63.6 | 60.18 | 65.62 |
| Elasticity modulus (MPa) | 2469 | 2484 | 2556 |
| Impact Izod (J/m) | 385 | 561 | 328 |
| Heat Distortion temperature (° C.) | 108 | 108 | 109 |

TABLE 4-continued

| PROPERTY | F-05 | Commercial Product |
|---|---|---|
| Tensile strength (MPa) | 66.34 | 50.8 |
| Elasticity modulus (MPa) | 2627 | 2551 |
| Impact Izod (J/m) | 555 | 374 |
| Heat Distortion temperature (° C.) | 110 | 111 |

TABLE 5

| PROPERTY | F-02 | F-03 | F-04 |
|---|---|---|---|
| Stable torque (N-m) | 39 | 30 | 35 |
| Stable torque temperature (° C.) | 218 | 215 | 217 |
| Fusion time (min.) | immediate | immediate | immediate |
| Dynamic thermal stability (DTS) minutes | 4 | 10 | 8 |
| Melt Index (g/10 min.) | * | 0.90 | 2.1 |

| PROPERTY | F-05 | Commercial Product |
|---|---|---|
| Stable torque (N-m) | 26 | 34 |
| Stable torque temperature (° C.) | 210 | 213 |
| Fusion time (min.) | 1.5 | 1 |
| Dynamic thermal stability (DTS) minutes | 18 | 12 |
| Melt Index (g/10 min.) | 4.34 | 0.87 |

* This figure could not be evaluated because the material degrades very rapidly within the chamber of the melt index equipment.

From the above data, it is obvious that F-05, that is the formula that with the combination of the selected additives and the high lubrication used, meets the properties according to classification cell 23447-B as outlined by ASTM-D1784 and shows processability values that are higher than any of the other examples shown, including the commercial product, which is the object of the present invention.

APPLICATION EXAMPLE

The highly lubricated formulas object of the present invention F-05 were prepared at industrial scale, mixed according to the above described procedure and extruded and injected in plant equipments to obtain pipes and accessories that were evaluated as finished product according the Mexican norm NMX-E-181-SCFI-2003. Among the most important characteristics, large increases in the production volumes were observed, compared to the current commercially available standard formulas. As an example, in the case of a half an inch pipe manufactured in the plant, the production increased from 97.75 kg/hr to 175.33 kg/hr compared to a commercially available compound. Another aspect to be underlined compared to other commercial products, is that the product obtained according to the present invention shows a high crushing strength. While the reference standard requires a test conducted on the product at 40% deformation without showing cracks, the products object of the present invention show a 100% deformation without cracks or fractures under the test conditions established in the method.

It will be appreciated that the invention can be used in other embodiments and that the invention is intended to include such modifications and alterations in so far as they fall within the scope of the appended claims or the equivalents thereof.

We claim:

1. A thermoplastic formulation for manufacturing pipes and fluid accessories for hot or cold water for home and industrial use, wherein the CPVC is a chlorinated polyvinyl chloride (PVC) resin prepared by photochlorination of water suspended PVC, comprising:
   a) a thermoplastic chlorinated polyvinyl compound (CPVC);
   b) antioxidant agents;
   c) polymer melt promoters;
   d) impact modifiers;
   e) a blend of internal and external lubricants; and
   f) mercaptides as thermal stabilizing agents, permitting the said lubricants and additives to improve the flow characteristics in kg/hr during the extrusion for the manufacturing of CPVC pipes; wherein the properties of the formulation meet the requirements of ASTM-D 1784, class 23447-B.

2. The thermoplastic formulation according to claim 1 wherein the antioxidant agent is selected from the group consisting of tetrakis[methylene(3,5-di-tert-butyl-4-hydroxyhydrociannamate)methane (Irganox 1010) and sterically hindered phenols.

3. The thermoplastic formulation according to claim 2 wherein the antioxidant agent is in the range of from 0.5 to 1.0 phr.

4. The thermoplastic formulation according to claim 2 wherein the antioxidant agent is in the range of from 0.2 to 3.0 phr.

5. The thermoplastic formulation according to claim 1, further comprising agents promoting the fusion (processing aid) which are polymeric compounds selected from the group consisting of acrylates methacrylates and combinations thereof.

6. The thermoplastic formulation according to claim 5 wherein the processing aid is in a range of from 1 to 4 phr.

7. The thermoplastic formulation according to claim 1 wherein the thermal stabilizing agents are selected from the group consisting of alkyltin mercaptides, tin esters and alkyl mercaptides.

8. The thermoplastic formulation according to claim 7 wherein the alkyl mercaptide is selected from a group consisting of methyl mercaptide, octyl mercaptide, and combinations or mixtures thereof.

9. The thermoplastic formulation according to claim 7 wherein the thermal stabilizing agent is in the range of from 1 to 2 phr.

10. The thermoplastic formulation according to claim 7 wherein the thermal stabilizing agent is in the range of from 1 to 4 phr.

11. The thermoplastic formulation according to claim 1 wherein the impact modifier is a polybutadiene elastomer.

12. The thermoplastic formulation according to claim 1 wherein the impact modifier is a terpolymer of polymethyl methacrylate butadiene-styrene (with the structure of a crosslinked elastomer core).

13. The thermoplastic formulation according to claim 1 wherein the impact modifier is in a range of from 6 to 9 phr.

14. The thermoplastic formulation according to claim 1, further comprising additives selected from the group consisting of pigments, colorants of carbon black, organic pigments, titanium dioxide and combinations thereof.

15. The thermoplastic formulation according to claim 14 wherein the additives are in a range from 0.001 to 8 phr.

16. The thermoplastic formulation according to claim 14 wherein the additives are in the range of below 2.7 phr.

17. The thermoplastic formulation according to claim 1, wherein the composition comprises:
   a) a thermoplastic resin of chlorinated polyvinyl chloride (CPVC), having a K value as PVC resin of between 58 and 67 at a 100 phr level;
   b) an antioxidant agent of tetrakis[methylene(3,5di-tert-butyl-4-hydroxyhydro cinnamato)methane, at a 0.75 phr level;
   c) an agent promoting the fusion (processing aid) of ethyl acrylate methyl methacrylate copolymer, at a level up to 1.0 phr;
   d) a thermostabilizing agent of methyltin mercaptide at a level of up to 2 phr;
   e) an impact modifying agent of polymethacrylate-butadiene-styrene terpolymer at a level of up to 8phr;
   f) a mixture of lubricant agents comprising:
      i) polyethylene wax 2 which is a homopolymer of polyethylene with a melting point between 92° C. and 122° C., at a level of up to 1.1 phr;
      ii) oxidized ethylene homopolymer which is oxidized polyethylene homopolymer with a melting point between 88° C. and 140° C., at a level up to 0.73 phr; and
      iii) paraffinic wax 2 which is a mixture of carbohydrate paraffinic waxes with melting point of from 66 to 70° C., at a level up to 2.2 phr.

18. A process for manufacturing thermoplastic formulations to manufacture pipes and fluid accessories for hot or cold water for home and industrial use, wherein the properties of the formulation meet the requirements of ASTM-D 1784, class 23447-B, wherein the CPVC is a chlorinated polyvinyl chloride (PVC) resin prepared by photochlorination of water suspended PVC, comprising the steps of:
   a) preparing a batch of CPVC resin at a 100 phr level and the additives according to claim 1, in an intensive mixer;
   b) adding the resin and increasing the temperature up to 60° C.;
   c) adding the stabilizer and heating the blend up to 90° C.;
   d) adding the rest of the additives, except the lubricants,
   e) adding the lubricants when the mixture reaches a temperature of 105° C.;
   f) cooling the mixture and obtaining the dry blend;
   g) plasticizing the blend in a roller mill at a temperature of 200° C., until a homogeneous mass is obtained;
   h) extracting the mass from the mill in layer shape;
   i) cutting the layers and placing between two plates to be pressed at a temperature of 200° C. under the following conditions:
      i) 2 minutes without pressure; and then
      ii) 5 minutes with a 30 ton pressure;
   j) allowing the plates obtained to rest during 24 hours under laboratory standard conditions at 23+/−2° C. and 50% relative humidity); and
   k) evaluating according to classification cell 23447-B cell as a compound as outlined by ASTM-D1784 and to the dry blend.

19. A manufacturing process for thermoplastic formulations according to claim 18, wherein the thermoplastic formulation has the properties according to classification cell 23447-B as outlined by ASTM-D1784 of stable torque (N-m), 26 comprising:
   a) a stable torque temperature: 210° C.;
   b) melting time: 1.5 minutes;
   c) dynamic thermal stability (DTS): 18 minutes;
   d) melt index: 4.34 g/10 min.

20. A process for manufacturing of pipes and thermoplastic CPVC accessories according to the thermoplastic formulation of claim 1, comprising extruding or injecting in a conventional equipment to obtain finished products having properties meeting Mexican norm NMX-E-181-SCFI-2003; said obtained product having properties comprising:
   a) deformation resistance of up to 100% of its diameter without showing fractures or cracks; and
   b) increased pipe production by up to 79% as compared to other known products.

21. The thermoplastic formulation for manufacturing pipes and fluid accessories for hot or cold water for home and industrial use according to claim 1, comprising:
   a) a thermoplastic chlorinated polyvinyl compound (CPVC) at a 100 phr (parts per 100 of resin) level;
   b) antioxidant agents;
   c) polymer melt promoters;
   d) impact modifiers; and
   e) a blend of internal and external lubricants at a range of from 3.5 to 7phr; and
   f) thermal stabilizing agents at a range of from 1 to 2phr.

22. The thermoplastic formulation according to claim 7 wherein the alkyl tin mercaptide is selected from a group consisting of butyltin mercaptides, metal tin mercaptides, and combinations or mixtures thereof.

23. The thermoplastic formulation according to claim 7 wherein the tin ester is dialkyltin dicarboxylate and combination thereof.

* * * * *